E. H. HEWER.
MECHANICAL POWER APPARATUS.
APPLICATION FILED OCT. 12, 1912.

1,054,412.

Patented Feb. 25, 1913.
2 SHEETS—SHEET 1.

E. H. HEWER.
MECHANICAL POWER APPARATUS.
APPLICATION FILED OCT. 12, 1912.

1,054,412.

Patented Feb. 25, 1913.
2 SHEETS—SHEET 2.

UNITED STATES PATENT OFFICE.

EDWARD H. HEWER, OF DELMER, ONTARIO, CANADA.

MECHANICAL POWER APPARATUS.

1,054,412.  Specification of Letters Patent.  Patented Feb. 25, 1913.

Application filed October 12, 1912. Serial No. 725,504.

*To all whom it may concern:*

Be it known that I, EDWARD HENRY HEWER, of the village of Delmer, in the county of Oxford and Province of Ontario, Dominion of Canada, have invented certain new and useful Improvements in Mechanical Power Apparatus; and I hereby declare that the following is a full, clear, and exact description of the same.

My invention relates to a manually turned power wheel provided with a main crank to effect its rotation under favorable turning conditions, and with an auxiliary crank which can be easily moved into or out of operative relation with the main crank to effect the turning of the wheel under abnormal conditions, and to provide the power wheel with a detent which will maintain the auxiliary crank in its inoperative position and thus prevent its interference with the turning of the wheel by the main crank.

Figures 1, 2:
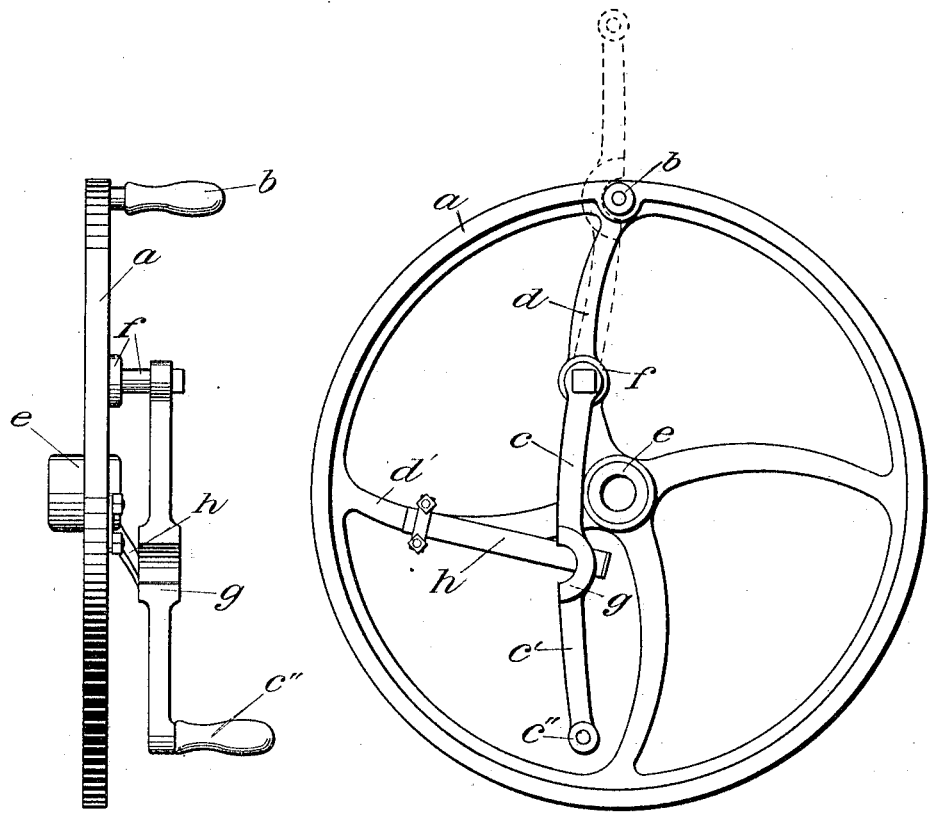
Figure 3:
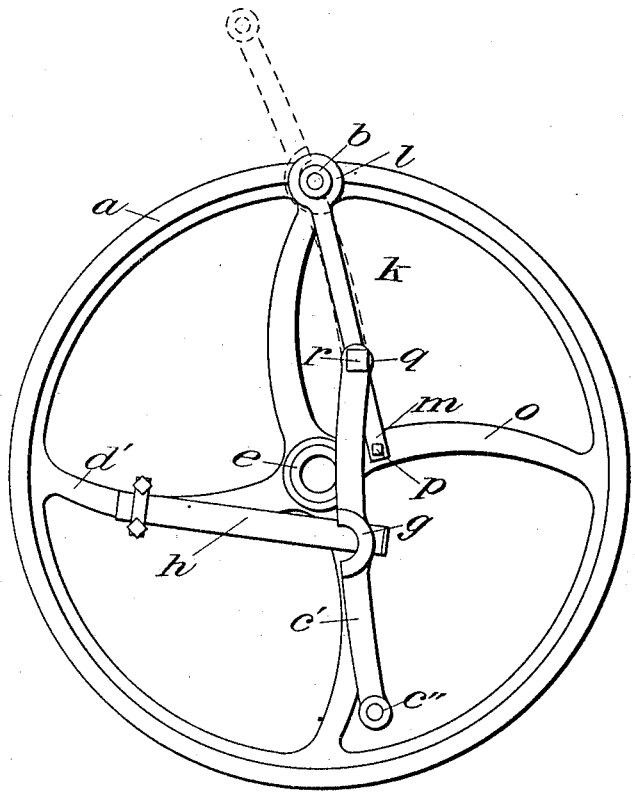

In the drawings: Figure 1, is a side elevation of a power wheel with the auxiliary crank shown in an inoperative position in full lines, and in dotted lines in an operative position; Fig. 2, is a side elevation of the construction shown in Fig. 1; Fig. 3, is a similar view to Fig. 1 of a modification of the construction shown therein; and, Fig. 4 is a similar view to Fig. 2 of the construction shown in Fig. 3.

Like characters of reference refer to like parts throughout the specification and drawings.

In the construction shown in Figs. 1 and 2, I have provided an ordinary power wheel $a$ with a main crank $b$ by which the wheel is manually rotated when turning "easy", and with an auxiliary crank $c$ which is brought into use when the wheel is turning "hard". The crank $c$ consists of a lever $c'$ pivotally connected at its inner end to the spoke $d$ between the main crank $b$ and the wheel hub $e$, and as shown in Fig. 2, the spoke $d$ is provided with a boss $f$ upon which the inner end of the lever $c'$ is mounted to enable it to clear the wheel hub $e$ as it swings into inoperative relation with the main crank $b$ as shown in full lines in Fig. 1, or into operative relation with the main crank as shown in dotted lines in the same figure. At the outer end of the lever $c'$ is the usual crank handle $c''$, and between the crank handle $c''$ and its inner end, the lever $c'$ is provided with a crank-engaging element $g$, this element being, as shown in Figs. 1 and 3, of a concave shape and so located as to engage the main crank $b$ when swung into the position shown in dotted lines in either of those figures. Attached to one of the other spokes $d''$ is a retaining spring $h$ engaged by the element $g$ when the auxiliary crank is swung into an inoperative position.

Figure 4:
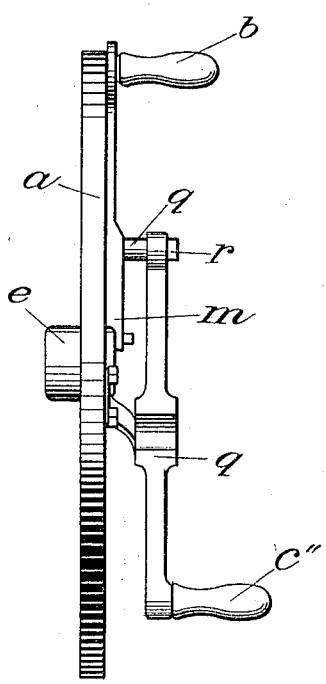

In Figs. 3 and 4, I have shown a construction for the same purpose as that above described and illustrated in Figs. 1 and 2, but instead of connecting the auxiliary crank to one of the spokes, I have provided the power wheel with a detachable arm $k$, having at its outer end an eye $l$, through which passes the main crank $b$; and having its inner end bifurcated, the forks $m$ of which engage one of the spokes $o$ adjacent to the wheel hub $e$, and are secured thereto by a bolt or bolts $p$. Interjacent the crank $b$ and spoke $o$, the coupling arm $k$ is provided with a boss $q$, to which the inner end of the lever $c'$ is fulcrumed by a bolt $r$.

In the use of the invention, the wheel is manually turned by the main crank, and its revolution is continued thereby until the wheel turns "hard", either as a result of an increased load, or from other natural or unnatural causes. When the wheel turns "hard", the auxiliary crank is moved from the position shown in full lines in the drawings to the position shown in dotted lines therein, the crank engaging element $g$ then embracing the main crank $b$, and the crank handle $c''$ projecting beyond the power wheel and providing an increased leverage which effects a reduction in the power required for the turning of the wheel. When the turning of the wheel can again be easily effected from the main crank, the auxiliary crank is moved back into the inoperative position shown in full lines in the drawings and is held in that position by means of the retaining spring $h$ until required to be brought again into use.

I prefer to make the auxiliary crank of such a length as to lie wholly within the circle of the wheel in its inoperative position, but I can make it of any desired length for any particular purpose.

I do not wish the invention to be confined to the specific construction hereinbefore described, as I can vary it within the scope of the appended claims without departing from the principle of the invention, the main feature of which is to provide a power wheel with an auxiliary crank which can be easily moved into operative or inoperative relations with the main crank, and which when in operative relation therewith, may be used for the purpose of turning the wheel, and which when in inoperative relation therewith, will not interfere with the turning of the wheel by the main crank.

Having thus described my invention, what I claim as new and desire to secure by Letters Patent, is:—

1. A manually-turned power wheel comprising a main crank, and an auxiliary crank adjustably connected thereto, said auxiliary crank consisting of a lever fulcrumed at one end to the power wheel and having at the other end a crank handle and an element interjacent the crank handle and fulcrum to engage the main crank to effect the turning of the wheel when the auxiliary crank is moved to an operative position.

2. A manually-turned power wheel comprising a main crank, an auxiliary crank adjustably connected thereto, said auxiliary crank consisting of a lever fulcrumed to one end of the power wheel and having at the other end a crank handle and an element interjacent the crank handle and fulcrum to engage the main crank to effect the turning of the wheel when the auxiliary crank is moved to an operative position, and means to retain the auxiliary crank in an inoperative position and prevent it interfering with the turning of the wheel by the main crank.

3. A manually-turned power wheel comprising a main crank, an auxiliary crank adjustably connected thereto, said auxiliary crank consisting of a lever fulcrumed at one end to the power wheel and having at the other end a crank handle and an element interjacent the crank handle and fulcrum to engage the main crank to effect the turning of the wheel when the auxiliary crank is moved to an operative position, and means to retain the auxiliary crank in an inoperative position and prevent it interfering with the turning of the wheel by the main crank, said means consisting of a yielding element resiliently engaging the auxiliary crank in its inoperative position.

4. A manually-turned power wheel comprising a main crank, an auxiliary crank adjustably connected thereto, said auxiliary crank consisting of a lever fulcrumed at one end to the power wheel and having at the other end a crank handle and an element interjacent the crank handle and fulcrum to engage the main crank to effect the turning of the wheel when the auxiliary crank is moved to an operative position, and means to retain the auxiliary crank in an inoperative position and prevent it interfering with the turning of the wheel by the main crank, said means consisting of a spring secured to one of the spokes to engage the auxiliary crank in its inoperative position.

5. A manually-turned power wheel comprising a main crank, a detachable arm secured to the power wheel, an auxiliary crank consisting of a lever fulcrumed at one end to the detachable arm and having at the other end a crank handle and an element intermediate the crank handle and fulcrum to engage said main crank, and means to hold the auxiliary crank in an inoperative position and prevent it interfering with the turning of the wheel by the main crank.

6. A manually-turned power wheel comprising a main crank, a detachable arm secured to the power wheel, an auxiliary crank consisting of a lever fulcrumed at one end to the detachable arm and having at the other end a crank handle and an element intermediate the crank handle and fulcrum to engage said main crank, and means to hold the auxiliary crank in an inoperative position and prevent it interfering with the turning of the wheel by the main crank, said means consisting of a yielding element resiliently engaging the auxiliary crank in its inoperative position.

7. A manually-turned power wheel comprising a main crank, a detachable arm secured to the power wheel, an auxiliary crank consisting of a lever fulcrumed at one end to the detachable arm and having at the other end a crank handle and an element intermediate the crank handle and fulcrum to engage said main crank, and means to hold the auxiliary crank in an inoperative position and prevent it interfering with the turning of the wheel by the main crank, said means consisting of a spring secured to one of the spokes to engage the auxiliary crank in its inoperative position.

Toronto, September 14th, 1912.

EDWARD H. HEWER.

Signed in the presence of—
 THOS. H. NIEBEY,
 EDWARD BEMSKIN.

---

Copies of this patent may be obtained for five cents each, by addressing the "Commissioner of Patents, Washington, D. C."